United States Patent
Makitalo et al.

(10) Patent No.: US 9,352,801 B2
(45) Date of Patent: May 31, 2016

(54) SNOWMOBILE FUEL TANK

(71) Applicant: BRP FINLAND OY, Rovaniemi (FI)

(72) Inventors: Kalevi Makitalo, Saarenkyla (FI); Esa Vaisanen, Rovaniemi (FI); Jari Jokelainen, Rovaniemi (FI)

(73) Assignee: BRP FINLAND OY, Rovaniemi (FI)

( * ) Notice: Subject to any disclaimer, the term of this patent is extended or adjusted under 35 U.S.C. 154(b) by 16 days.

(21) Appl. No.: 14/204,090

(22) Filed: Mar. 11, 2014

(65) Prior Publication Data
US 2015/0068827 A1    Mar. 12, 2015

(30) Foreign Application Priority Data
Sep. 10, 2013  (RU) ................................ 2013141562

(51) Int. Cl.
*B62M 27/02*  (2006.01)
*B60K 15/073*  (2006.01)
*B60R 16/04*  (2006.01)

(52) U.S. Cl.
CPC .............. *B62M 27/02* (2013.01); *B60K 15/073* (2013.01); *B60R 16/04* (2013.01)

(58) Field of Classification Search
CPC ................. B62M 2027/023; B62M 2027/028; B60K 15/063
See application file for complete search history.

(56) References Cited

U.S. PATENT DOCUMENTS

| | | | | |
|---|---|---|---|---|
| 5,904,217 A * | 5/1999 | Yamamoto | ........... | B62D 55/108 180/190 |
| 5,947,220 A * | 9/1999 | Oka | ........ | B62M 27/02 180/193 |
| 5,992,552 A * | 11/1999 | Eto | ......... | B62M 27/00 180/190 |
| 5,996,717 A * | 12/1999 | Hisadomi | .............. | B62M 27/02 180/182 |
| 6,086,149 A * | 7/2000 | Atherley | ................... | B60N 2/24 180/219 |
| 6,170,589 B1 * | 1/2001 | Kawano | ................. | B62M 27/02 180/190 |
| 7,802,646 B2 * | 9/2010 | Matsudo | ................ | B62M 27/02 180/182 |
| 8,191,665 B1 * | 6/2012 | Sampson | ................. | B62J 25/00 180/190 |
| 2002/0134603 A1 * | 9/2002 | Ashida | .................... | F02B 67/06 180/186 |

(Continued)

OTHER PUBLICATIONS

Brown's Leisure World Ltd., Artic Cat Snowmobile Parts, Model 2012- M 1100 153, Battery and Tray Assembly, Yorkton, Saskatchewan, Canada. http://www.brownsleisureworld.com/frame. cgi?url=http%3A//www.brownsleisureworld.com/Parts/SNOW-MOBILE/. Retrieved on Sep. 26, 2014.

(Continued)

*Primary Examiner* — Kevin Hurley
*Assistant Examiner* — Gabriela C Craciun
(74) *Attorney, Agent, or Firm* — BCF LLP (57) ABSTRACT

A snowmobile has a frame having a tunnel, an engine supported by the frame, at least one ski connected to the frame, a drive track operatively connected to the engine and disposed at least in part below the tunnel, and a fuel tank connected to a top of the tunnel. The fuel tank defines a passage extending therethrough from a top of the fuel tank to a bottom of the fuel tank. The passage is adapted for receiving a battery therein.

20 Claims, 8 Drawing Sheets

(56) References Cited

U.S. PATENT DOCUMENTS

| | | | | |
|---|---|---|---|---|
| 2002/0148662 A1* | 10/2002 | Ashida | ................... | B62M 27/02 180/190 |
| 2002/0179356 A1* | 12/2002 | Morii | ..................... | B62M 27/02 180/190 |
| 2004/0032153 A1* | 2/2004 | Atherley | ................... | B60N 2/24 297/195.12 |
| 2004/0237927 A1* | 12/2004 | Morii | ..................... | B62M 27/02 123/193.5 |
| 2009/0080999 A1* | 3/2009 | Dunn | ...................... | F16B 21/02 411/500 |
| 2009/0166108 A1* | 7/2009 | Gross | ...................... | F02B 63/04 180/65.21 |
| 2010/0163327 A1* | 7/2010 | Bernier | ................. | B62M 27/02 180/190 |
| 2011/0094814 A1* | 4/2011 | Nagao | ................... | B62M 27/02 180/190 |
| 2015/0101872 A1* | 4/2015 | Girouard | ................. | F16D 55/22 180/9.42 |
| 2015/0114343 A1* | 4/2015 | Bernier | ..................... | F02D 9/02 123/337 |

OTHER PUBLICATIONS

Brown's Leisure World Ltd., Artic Cat Snowmobile Parts, Model 2012- M 1100 153, Gas Tank Assembly, Yorkton, Saskatchewan, Canada. http://www.brownsleisureworld.com/frame.cgi?url=http%3A//www.brownsleisureworld.com/Parts/SNOWMOBILE. Retrieved on Sep. 26, 2014.

Zeppelin, Shane, 2014 Snowmobile Model Lineup—Yamaha and the New SR Viper, MaxSled.com Snowmobile Magazine, pp. 1-26, 2014. http://maxsled.com/snowmobile/2014-model-lineup-yamaha/. Retrieved on Aug. 20, 2014.

* cited by examiner

SNOWMOBILE FUEL TANK

CROSS-REFERENCE

The present application claims priority of Russian Patent Application No. 2013141562, filed Sep. 10, 2013, the entirety of which is incorporated herein by reference.

FIELD OF TECHNOLOGY

The present technology relates to snowmobile fuel tanks and snowmobiles having fuel tanks.

BACKGROUND

Many snowmobiles, such as those provided with an electric starter motor, have a battery supplying electricity to one or more electrical component. The battery is typically located in an engine compartment defined by front fairings at the front of the snowmobile.

The engine compartment contains the engine as well as many elements associated with the engine such as parts of the air intake system, of the exhaust system and the fuel supply system. As such, locating the battery in this already crowded space can be challenging. This sometimes requires design compromises with respect to other components of the snowmobile located in the engine compartment in order to fit the battery.

Therefore, it would be desirable to be able to provide the battery outside of the engine compartment of the snowmobile.

Furthermore, the battery is relatively heavy and as such adds a substantial amount of weight at the front of the snowmobile, which, in some cases, can reduce the effectiveness of the skis for floating on the snow.

It would therefore be desirable to move the battery away from the front of the snowmobile in order to reduce the weight at the front of the snowmobile.

SUMMARY

It is an object of the present technology to ameliorate at least some of the inconveniences present in the prior art.

In one aspect, the embodiments of the present technology provide a snowmobile having a frame having a tunnel, an engine supported by the frame, at least one ski connected to the frame, a drive track operatively connected to the engine and disposed at least in part below the tunnel, and a fuel tank connected to a top of the tunnel. The fuel tank defines a passage extending therethrough from a top of the fuel tank to a bottom of the fuel tank. The passage is adapted for receiving a battery therein.

In an additional aspect, the battery is disposed in the passage.

In a further aspect, a seat is connected to the top of the fuel tank.

In an additional aspect, the passage is disposed rearward of the seat.

In a further aspect, the battery is connected to the tunnel.

In an additional aspect, a bracket is disposed at least in part in the passage and is connected to the tunnel. The battery is connected to the tunnel via the bracket.

In a further aspect, the bracket extends in part under the battery. A battery support platform is disposed in the passage between the battery and the bracket.

In an additional aspect, the battery support platform rests on the top of the tunnel.

In a further aspect, the fuel tank defines tabs extending inwardly in the passage. The tabs are disposed between the battery support platform and the top of the tunnel.

In an additional aspect, the battery support platform has at least one vertically extending tab abutting a side of the battery.

In a further aspect, a battery support platform is disposed in the passage between the battery and the top of the tunnel.

In an additional aspect, electrical cables are connected to the battery. The passage is a first passage. The electrical cables pass through a second passage defined between the battery support platform and a wall of the fuel tank defining the first passage.

In a further aspect, electrical cables are connected to the battery. The passage is a first passage. The electrical cables pass through a second passage defined between the top tunnel and a bottom of the fuel tank.

In an additional aspect, a cover is selectively connected to the fuel tank for closing a top of the passage.

In a further aspect, the fuel tank defines at least in part at least one groove. The cover has at least one tongue. The at least one tongue is disposed in the at least one groove when the cover is connected to the fuel tank for closing the top of the passage.

In an additional aspect, at least one fastener fastens the cover to the fuel tank when the cover is connected to the fuel tank for closing the top of the passage.

In a further aspect, the at least one fastener is at least one toolless fastener.

In another aspect, embodiments of the present technology provide a fuel tank for a snowmobile having a fuel tank body defining an internal volume for receiving fuel, an aperture defined in the fuel tank body and fluidly communicating with the internal volume, and a cap selectively closing the aperture. The bottom of the fuel tank body is adapted for mounting on a tunnel of a snowmobile. The fuel tank body defines a passage extending therethrough from a top of the fuel tank body to a bottom of the fuel tank body. The passage is adapted for receiving a battery therein.

In a further aspect, a top of the fuel tank body is adapted for connecting a snowmobile seat thereto forwardly of the passage.

In an additional aspect, a battery support platform is disposed in the passage.

In a further aspect, the fuel tank body defines tabs extending inwardly in the passage. The battery support platform is disposed on the tabs.

In an additional aspect, a removable cover is connected to the fuel tank body for closing a top of the passage.

In a further aspect, the fuel tank body defines at least in part at least one groove. The cover has at least one tongue. The at least one tongue is disposed in the at least one groove when the cover is connected to the fuel tank body for closing the top of the passage.

For purposes of this application, terms related to spatial orientation such as forwardly, rearward, upwardly, downwardly, left, and right, are as they would normally be understood by a driver of the snowmobile in a normal riding position. Terms related to spatial orientation when describing or referring to components or sub-assemblies of the vehicle, separately from the snowmobile, such as a fuel tank for example, should be understood as they would be understood when these components or sub-assemblies are mounted to the snowmobile.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
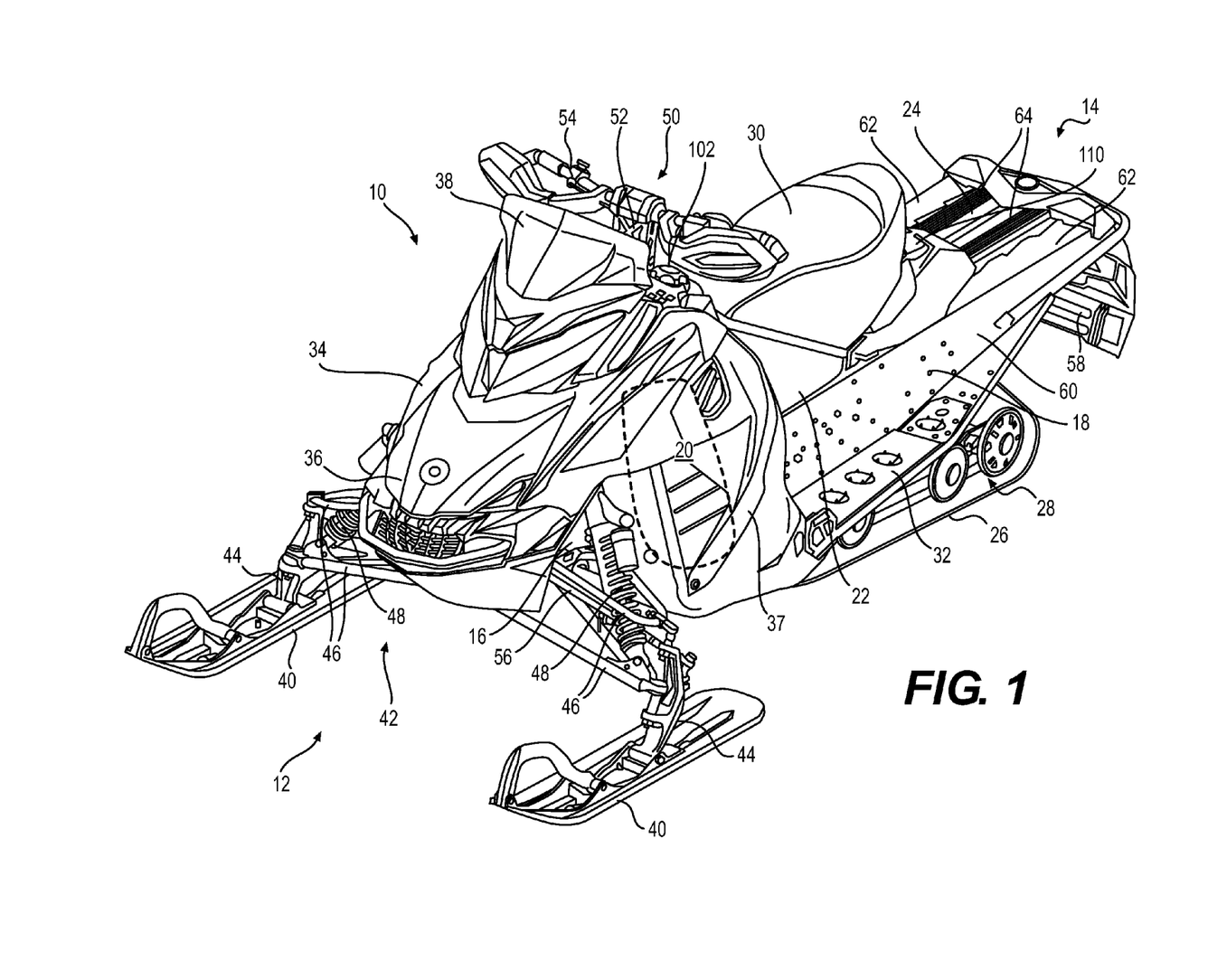
FIG. 1 is a perspective view taken from a front, left side of a snowmobile.

Referring to FIG. 1, a snowmobile 10 includes a forward end 12 and a rearward end 14. The snowmobile 10 includes a vehicle body in the form of a frame or chassis 16 which includes a tunnel 18.

An internal combustion engine 20 is carried in an engine compartment defined in part by the frame 16. A fuel tank 22, connected to a top of the tunnel 18, supplies fuel to the engine 22 for its operation. The fuel tank 22 will be described in greater detail below. Coolant used to cool the engine 20 is circulated through a heat exchanger assembly 24 that forms part of the top of the tunnel 18.

An endless drive track 26 is positioned at the rear of the snowmobile 10. The drive track 26 is disposed generally under the tunnel 18, and is operatively connected to the engine 20 through a belt transmission system (not shown) and a reduction drive (not shown). The endless drive track 26 is driven to run about a rear suspension assembly 28 connected to the frame 16 for propulsion of the snowmobile 10.

A straddle-type seat 30 is connected to a top of the fuel tank 28. The seat 30 is adapted to accommodate a driver of the snowmobile 10. The seat 30 could also be configured to accommodate a passenger. A footrest 32, defined in part by the tunnel 18, is positioned on each side of the snowmobile 10 below the seat 30 to accommodate the driver's feet.

At the front end 12 of the snowmobile 10, fairings 34 enclose the engine 20 and the belt transmission system, thereby providing an external shell that not only protects the engine 20 and the transmission system, but can also make the snowmobile 10 more aesthetically pleasing. The fairings 34 include a hood 36 and one or more side panels 37 which can be opened to allow access to the engine 20 and the belt transmission system when this is required, for example, for inspection or maintenance of the engine 20 and/or the transmission system. A windshield 38 connected to the fairings 34 acts as a wind screen to lessen the force of the air on the rider while the snowmobile 10 is moving.

Two skis 40 positioned at the forward end 12 of the snowmobile 10 are attached to the frame 16 through a front suspension assembly 42. The front suspension assembly 42 includes ski legs 44, supporting arms 46 and shock absorbers 48. It is contemplated that the snowmobile 10 could have only one or more than two skis 40.

A steering assembly 50, including a steering column 52 and a handlebar 54, is provided generally forward of the fuel tank 22 and the seat 30. The steering column 52 is rotatably connected to the frame 16. The lower end of the steering column 52 is connected to the ski legs 44 via steering rods 56 (only a left one of which is shown). The handlebar 54 is attached to the upper end of the steering column 52. The handlebar 54 is positioned in front of the seat 30. The handlebar 54 is used to rotate the steering column 52, and thereby the skis 40, in order to steer the snowmobile 10. A throttle operator (not shown) in the form of a finger-actuated throttle lever is mounted to the right side of the handlebar 54. Other types of throttle operators, such as a thumb-actuated throttle lever and a twist grip, are also contemplated. A brake actuator (not shown), in the form of a hand brake lever, is provided on the left side of the handlebar 54 for braking the snowmobile 10 in a known manner. It is contemplated that the windshield 38 could be connected directly to the handlebar 54.

At the rear end of the snowmobile 10, a snow flap 58 extends downward from the rear end of the tunnel 18. The snow flap 58 protects against dirt and snow that can be projected upward from the drive track 26 when the snowmobile 10 is being driven. It is contemplated that the snow flap 58 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 2:
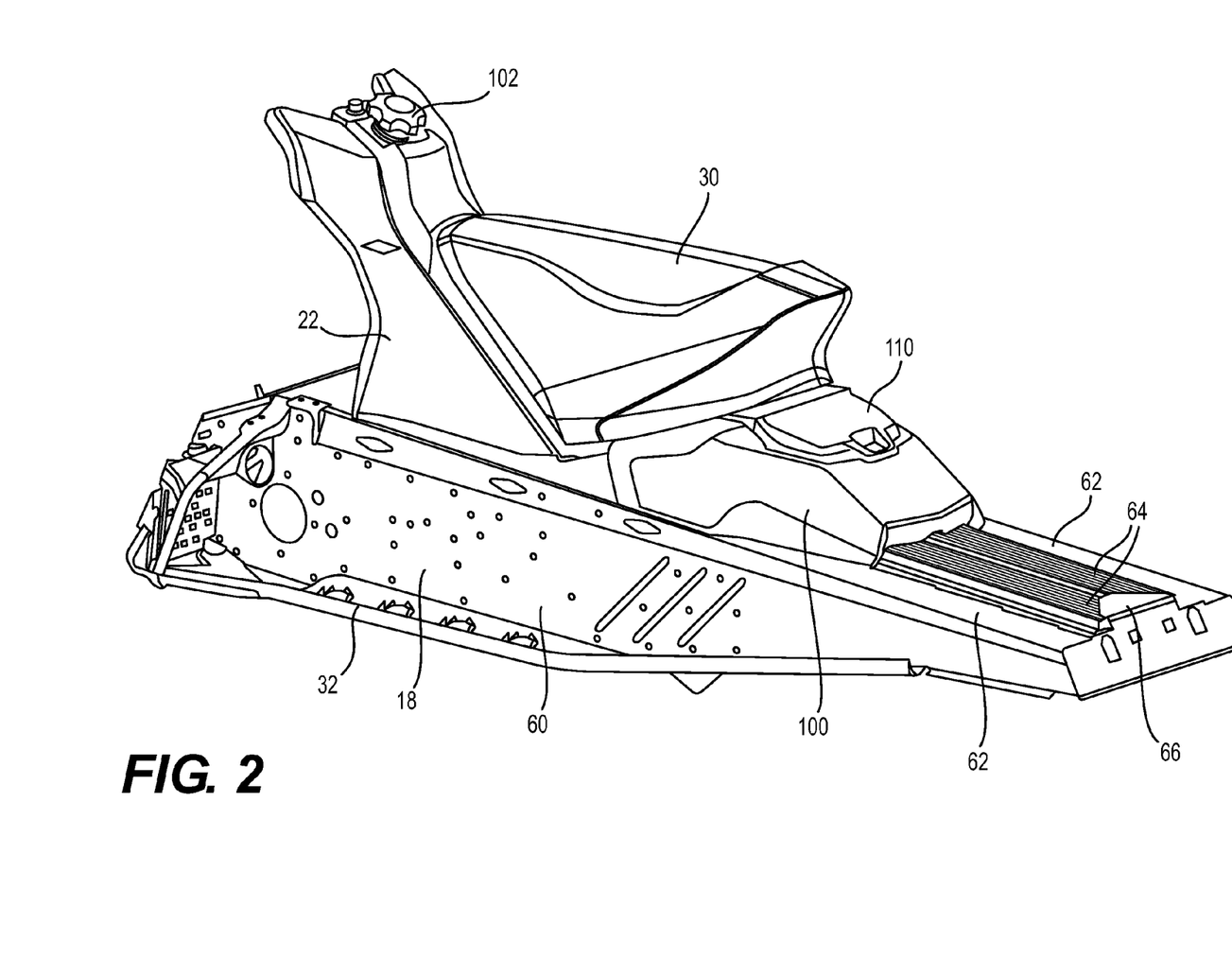
FIG. 2 is a perspective view taken from a rear, left side of a tunnel, fuel tank and seat of the snowmobile of FIG. 1.

Turning now to FIG. 2, the tunnel 18 will be described in more detail. The tunnel 18 has two side portions 60. Each side portion 60 is made from a bent piece of sheet metal. Each side portion has a horizontally extending top portion 62 and is bent at its bottom to form part of the footrest 32. The heat exchanger assembly 24 is fastened to the top portions 62 between the side portions 60, thereby forming a portion of the top the tunnel 18. The heat exchanger assembly 24 defines two tubes 64 of rectangular cross-section connected together at their rear by a third tube 66 thereby allowing the flow of engine coolant therethrough. Snow projected by the drive track 26 onto the heat exchanger assembly 24 and the flow of air along the heat exchanger assembly 24 while the snowmobile 10 is in use cool the coolant flowing through the heat exchanger assembly 24.

Turning now to FIGS. 3 to 7, the fuel tank 22 will be described in greater detail. The fuel tank 22 has a fuel tank body 100. A fuel tank filler aperture is defined in a top of the fuel tank body 100 forward of the seat 30. The fuel tank filler aperture is selectively closed by a threaded fuel cap 102. Removing the fuel cap 102 allows the internal volume defined by the fuel tank body 100 to be filled with fuel via the fuel tank filler aperture. The bottom of the fuel tank body 100 is adapted to be connected to the top of the tunnel 18. In one embodiment, the fuel tank body 100 is fastened to the top of the tunnel 18. The top portion 104 of the fuel tank 100 disposed rearward of the fuel cap 102 has various features permitting the connection of the seat 30 to the top of the fuel tank body 100. A fuel pump (not shown) is disposed inside the fuel tank body 100. Fuel hoses (not shown) extending through a front surface of the fuel tank body 100 fluidly connect the fuel pump to the fuel injector of the engine 20 to permit delivery of fuel from the fuel tank 22 to the engine 20.

Figure 5:
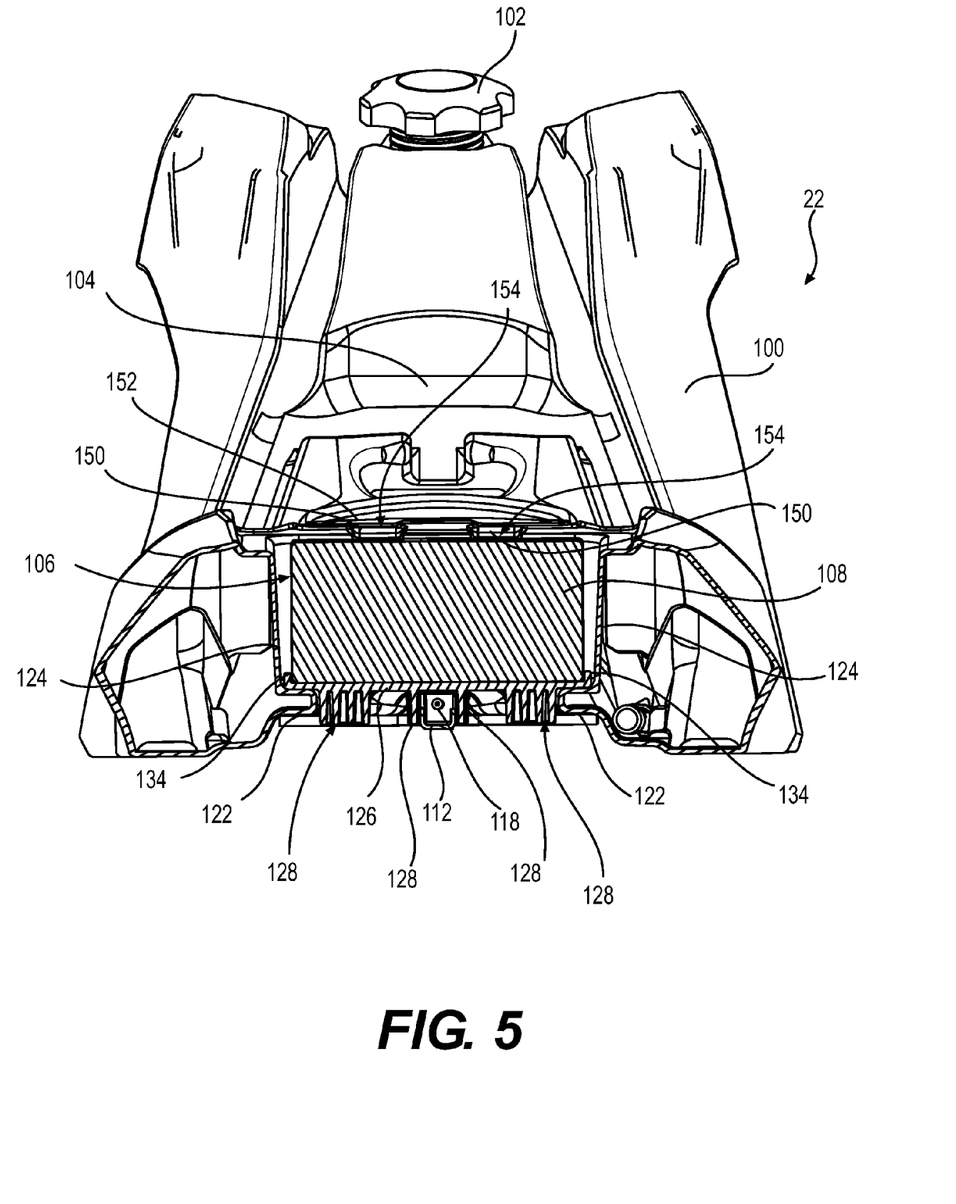
FIG. 5 is a cross-sectional view of the fuel tank and battery of FIG. 4 taken through line 5-5 of FIG. 4.
Figure 6:
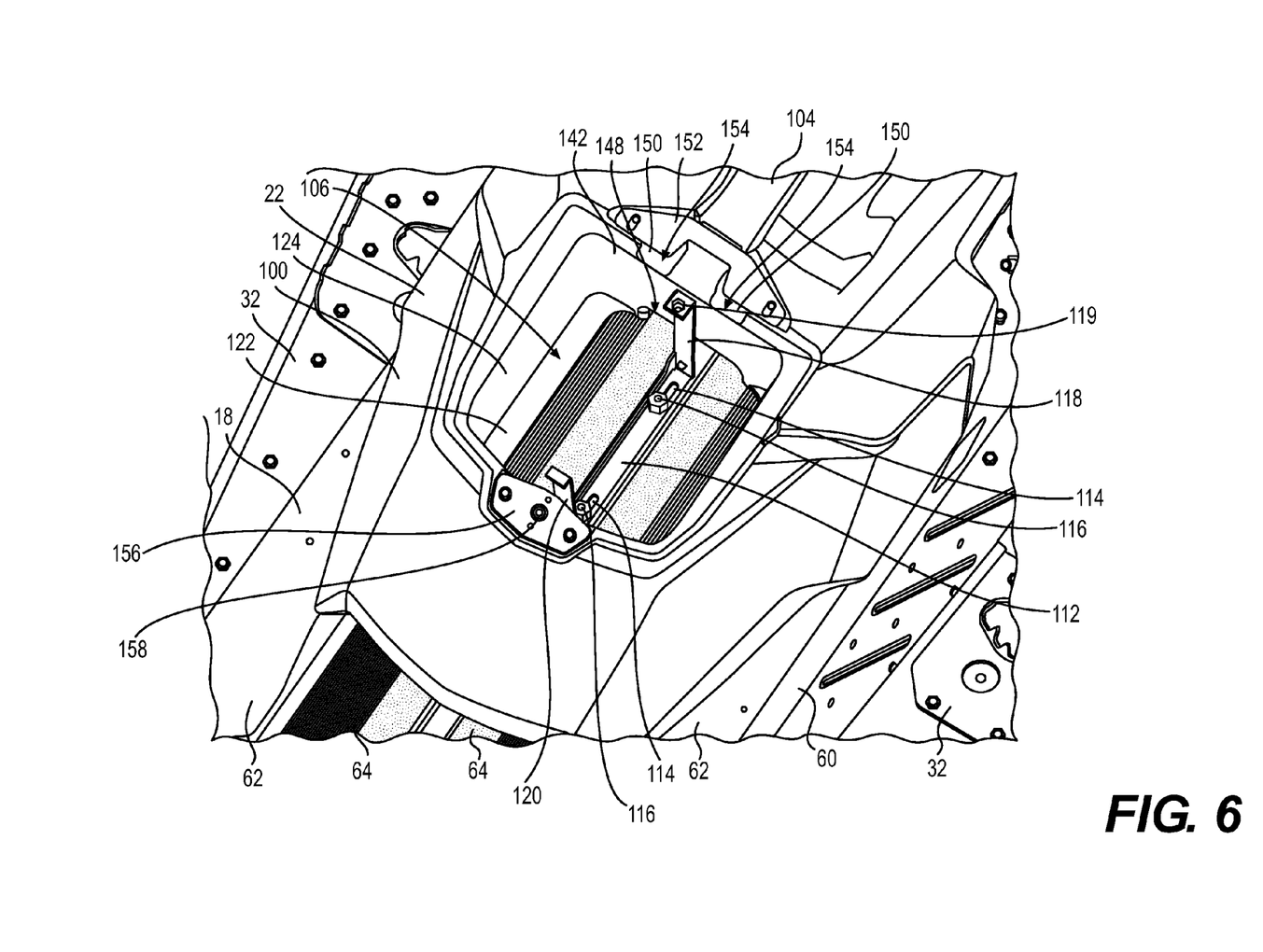
FIG. 6 is a close-up perspective view taken from a rear, right side of a portion of the snowmobile of FIG. 1 where a rear portion of the fuel tank is located, with the seat, the battery cover, the battery and a battery support platform removed.

As best seen in FIG. 6, the fuel tank body 100 defines a passage 106 extending therethrough from the top of the fuel tank body 100 to the bottom of the fuel tank body 100. The passage 106 is disposed rearward of seat 30 and is laterally centered on the snowmobile 10. The passage 106 has a generally rectangular cross-section and is large enough to receive a battery 108 of the snowmobile 10. As can be seen in FIG. 5, a top portion of the passage 106 is larger than the middle portion of the passage 106. This enlarged portion of the passage 106 receives a removable cover 110 therein such that the cover more closely follows a shape of the fuel tank body 100. It is contemplated that the enlarged portion of the passage 106 could be omitted and that the cover 110 could be connected to the top of the fuel tank body 100 around the top of the passage 106 to close the top of the passage 106. The cover 110 will be described in greater detail below.

As can be seen in FIG. 6, a bottom bracket 112 having two slots 114 is disposed inside the passage 106. The bracket 112 is fastened to the top of the tunnel 18 by two threaded fasteners 116. The fasteners 116 are inserted from a bottom of the tunnel 18 through the top of the tunnel 18 between the tubes 64 of the heat exchanger assembly 24. The fasteners 116 pass through the slots 114 of the bracket 112 and nuts (not labeled) are fastened onto the fasteners 116 to retain the bracket 112 on the top of the tunnel 18. As can be seen, the bracket 112 is disposed between the tubes 64 of the heat exchanger assembly 24. It is contemplated that the bracket 112 could be connected to the top of the tunnel 18 by other means. For example, the bracket 112 could be welded to the top of the tunnel 18. A front bracket 118 having a bent upper end is fastened to a tab of the bracket 112 at a front of the bracket 112. The bent upper end of the bracket 118 has a threaded aperture 119. As such, the front bracket 118 extends generally vertically in the passage 106 near a front thereof. A rear bracket 120 having a bent upper end is fastened to a tab of the bracket 112 at a rear of the bracket 112. As such, the rear bracket 120 extends generally vertically in the passage 106 near a rear thereof. It is contemplated that the brackets 112, 118, 120 could be integrally formed. It is also connected that the bracket 112 could be omitted and that the brackets 118, 120 could be connected directly to the top of the tunnel 18.

As can be seen in FIGS. 5 and 6, tabs 122 defined by the fuel tank body 100 extend laterally inwardly from the surfaces of the fuel tank body 100 defining the side walls 124 of the passage 106. The tabs 122 are located near a bottom of the passage 106.

Figure 7:
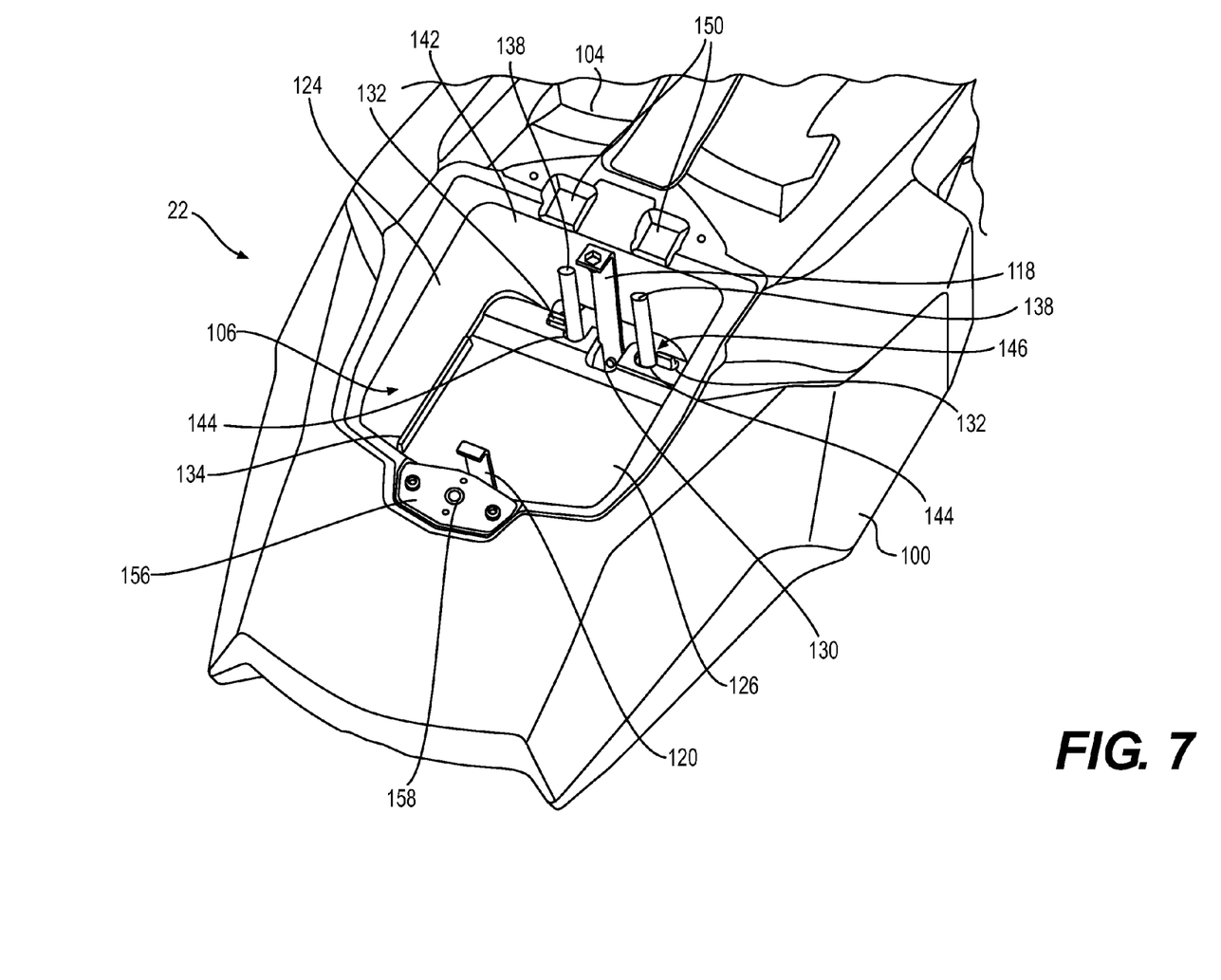
FIG. 7 is a close-up perspective view taken from a rear, right side of a rear portion of the fuel tank of FIG. 3, with the battery cover and the battery removed.

As can be seen in FIGS. 5 and 7, a battery support platform 126 is disposed in the passage 106 over the bracket 112 and the tabs 122. The lateral sides of the battery support platform 126 rest on top of the tabs 122. The battery support platform 126 has legs 128 extending from the bottom thereof. The legs 128 of the battery support platform 126 rest on the top of the tunnel 18. The battery support platform 126 has recesses 130 at a front and rear thereof (only a front one of which is shown in FIG. 7) receiving the brackets 118, 120 therein. The battery support platform 126 has two front tabs 132, two side tabs 134 and two rear tabs (not shown) extending vertically upwardly therefrom. It is contemplated that the battery support platform 126 could have more or less vertically upwardly extending tabs or that these tabs could be omitted.

Figure 3:
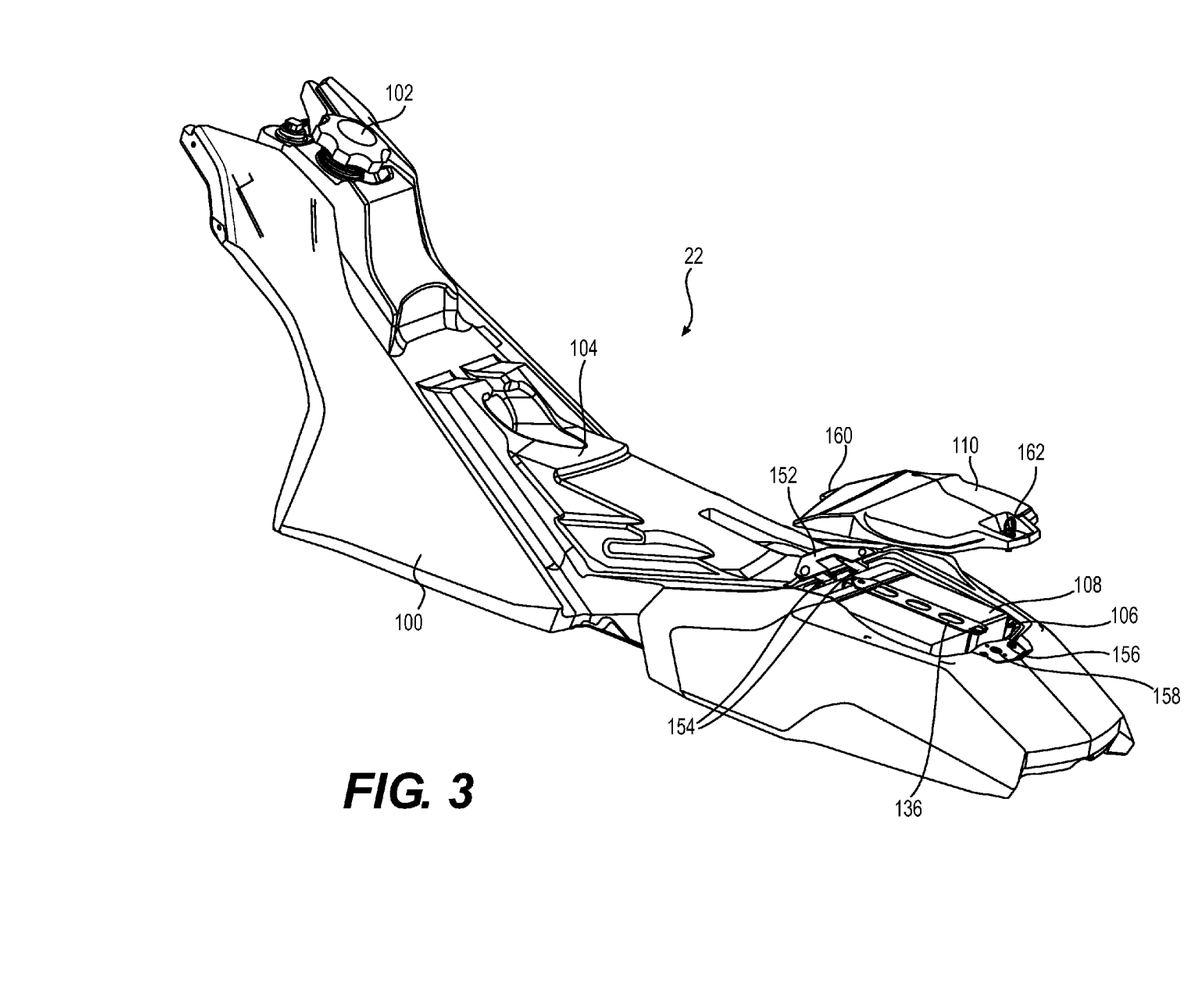
FIG. 3 is a perspective view taken from a rear, left side of the fuel tank of the snowmobile of FIG. 1 with a battery cover of the fuel tank shown disconnected from the fuel tank to show a battery disposed in a passage of the fuel tank.
Figure 4:
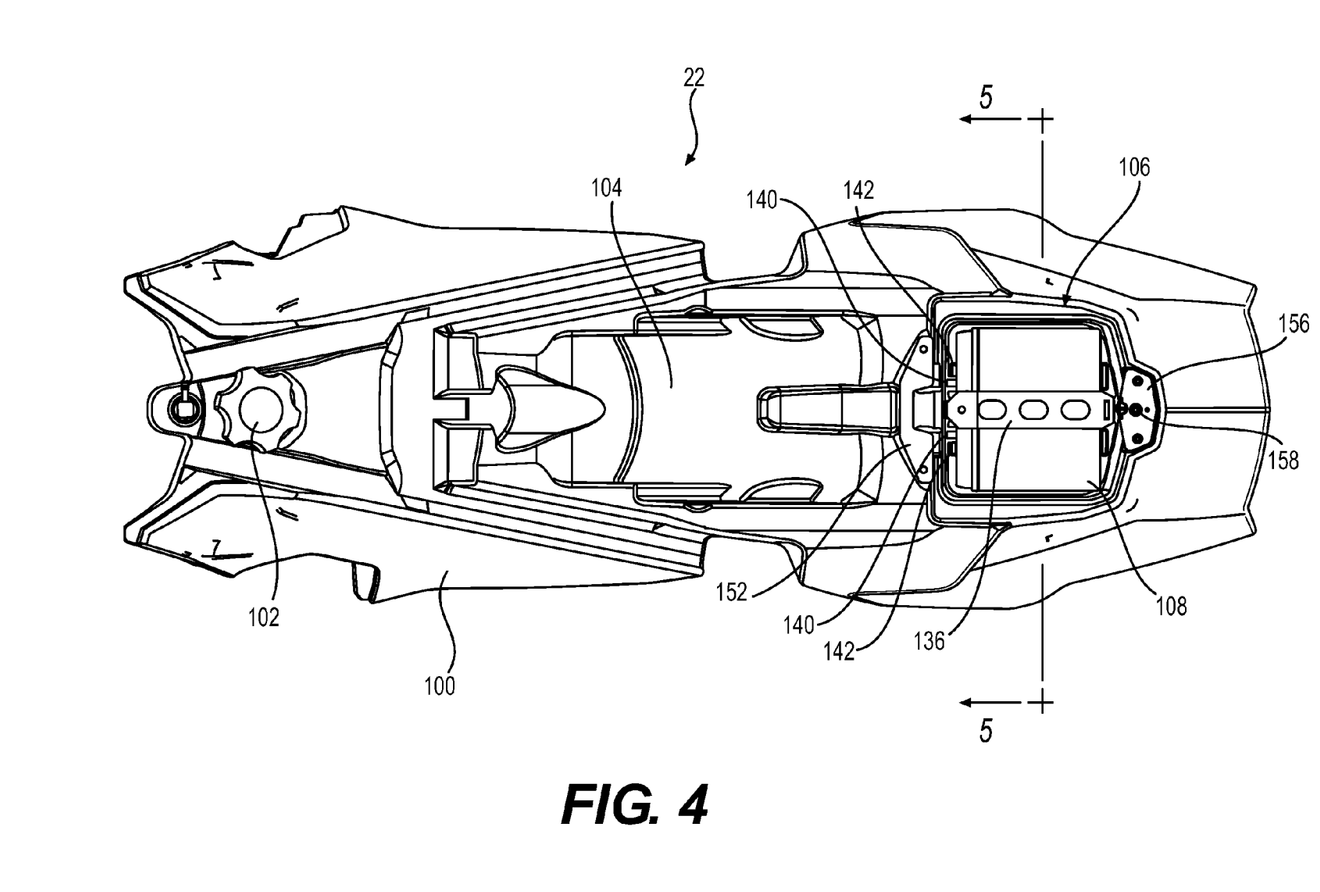
FIG. 4 is a top plan view of the fuel tank and battery of FIG. 3, with the battery cover of the fuel tank removed.

The battery 108 is disposed in the passage 106 on top of the battery support platform 126 between the brackets 118, 120. The front tabs 132, the side tabs 134 and the rear tabs of the battery support platform abut the sides of the battery 108 to prevent lateral movement of the battery 108 in the passage 106. As can be seen in FIG. 5, the top of the battery 108 is disposed below the top of the passage 106. As can be seen in FIGS. 3 and 4, a band 136 disposed over the top of the battery 108 secure the battery 108 in place and, as a result, connects the battery 108 to the top of the tunnel 18 via the brackets 112, 118, 120. The band 136 has a slot at a rear thereof and an aperture at a front thereof. The slot of the band 136 is inserted around the bent upper end of the bracket 120. A threaded fastener is then fastened in the aperture at the front of the band 136 and the aperture 119 in the bent upper end of the bracket 118. It is contemplated that the band 136 could be connected to the brackets 118, 120 by other means. For example, the band 136 could be fastened at both ends or could be hinged to one of the brackets 118, 120 and fastened to the other.

By securing the battery 108 as described above, not only is the battery 108 connected to the top of the tunnel 18, but the fuel tank 22 is also retained on the top of the tunnel 18 due to the tabs 122 being disposed under the battery support platform 126 that is held between the battery 108 and the top of the tunnel 18.

The battery 108 is electrically connected to one or more electrical component of the snowmobile 10 disposed forwardly of the seat 30 by electrical cables 138 (FIG. 7). In one embodiment, the electrical component in an electric starter motor (not shown) of the snowmobile 10. The electrical cables 138 are connected to posts 140 (FIG. 4) of the battery 108 on either side of the bracket 118. From the posts 140, the cables extend downwardly between the front of the battery 108 and a front wall 142 of the passage 106 defined by the fuel tank body 100. The cables 138 are then received in recess 144 (FIG. 7) defined by the battery support platform 126 and pass through a passage 146 (FIG. 7) defined between the front wall 142 and the battery support platform 126. The cables 138 then extend forward between the top of the tunnel 18 and the bottom of the fuel tank body 100 in a passage 148 (FIG. 6) defined therebetween. The cables 138 then enter the engine compartment to be connected to the electrical component(s).

Turning now to FIGS. 2, 3, 6 and 7, the cover 110 and the manner in which it is connected to the fuel tank body 100 will be described in more detail.

As best seen in FIG. 7, the fuel tank body 100 defines two recesses 150 on a top thereof, forward of the front wall 142 of the passage 106. As best seen in FIG. 6, a plate 152 is fastened to the fuel tank body 100 over the two recesses 150. As a result, two grooves 154 are formed between the recesses 150 and the plate 152. A plate 156, best seen in FIGS. 6 and 7, having an aperture 158 is fastened to the top of the fuel tank body 100 rearward of the bracket 120. As best seen in FIG. 3, the cover 110 has two tongues 160 (only one of which is shown) extending from a front thereof. At the rear of the cover 110, a toolless fastener 162 (i.e. a fastener designed to be fastened and unfastened without requiring the use of a tool) is inserted through an aperture in the cover 110 (not labeled). In the present embodiment, the toolless fastener 162 is a quarter turn screw. It is contemplated that other types of toolless fasteners could be used, such as, for example, a butterfly screw, a quick release pin or a latch. It is also contemplated that fasteners requiring the use of a tool to be fastened and unfastened could be used.

To attach the cover 110 to the fuel tank body 100 to close the top of the passage 106 as shown in FIG. 2, the tongues 160 of the cover 110 are first inserted in the grooves 154, the rear part of the cover 110 is lowered against the top of the fuel tank body 100 to align the toolless fastener 162 with the threaded aperture 158 in the plate 156 and the toolless fastener 162 is fastened to the plate 156. To remove the cover 110, the toolless fastener 162 is unfastened and the cover 110 is lifted from the fuel tank body 100. When it is connected to the fuel tank body 100, the cover 110 protects the battery 108 from the environment.

It is contemplated that there could be only one or more than two grooves 154, in which case the cover 110 would have a corresponding number of tongues 160. It is also contemplated that there could be more than one threaded aperture 158 and fastener 162. It is also contemplated that the grooves 154 could be provided at the back of the passage 106 and the plate 156 with the threaded aperture 158 could be provided at the front of the passage 106, in which case the tongues 160 would be provided at the rear of the cover 110 and the fastener 162 at the front of the cover 110. It is also contemplated that the grooves 154 could be provided one side of the passage 106 and the plate 156 with the threaded aperture 158 could be provided on the other side of the passage 106, in which case the tongues 160 would be provided on one side of the cover 110 and the fastener 162 on the other side of the cover 110. It is also contemplated that the cover 110 could be fastened to the fuel tank body by other means. For example, the cover 110 could be hinged to the fuel tank body 100 on one side and fastened by a latch or other means on another side. Also for example, the cover could be fastened by threaded fasteners on two or more sides thereof to the fuel tank body 100.

Figure 8:
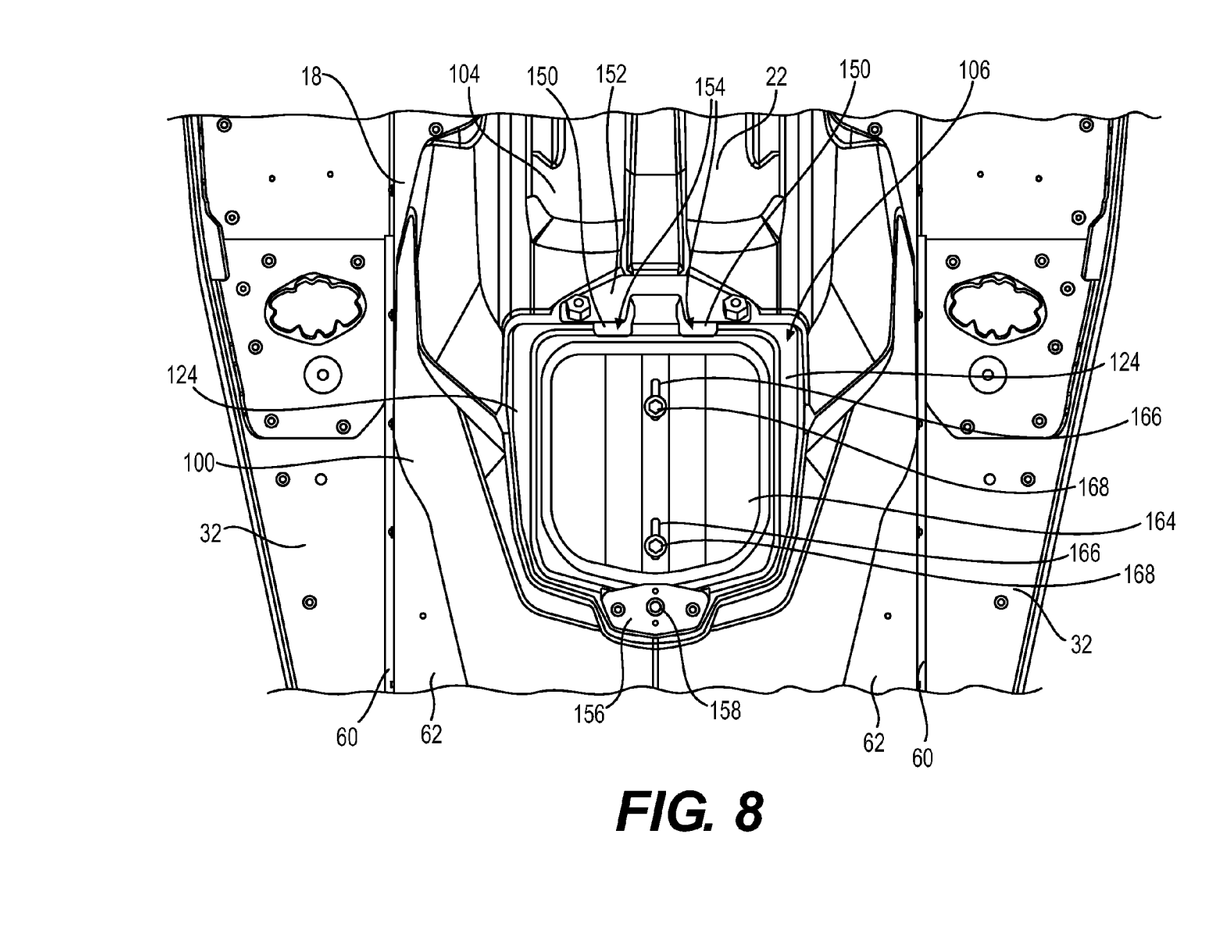
FIG. 8 is a close-up top plan view of a portion of the snowmobile of FIG. 1 where a rear portion of the fuel tank is located, with the seat and the battery cover removed and with the battery support platform replaced with a bottom cap for when the snowmobile of FIG. 1 is not provided with a battery.

It is contemplated that the fuel tank 22 described above can be used in a snowmobile 10 that does not have a battery 108. For example, a snowmobile 10 having a pull-start engine starting system instead of an electrical starter motor does not require a battery 108. In such an embodiment, illustrated in FIG. 8, the passage 106 defined in the fuel tank 22 can be used to form a storage compartment. In the embodiment of FIG. 8, the battery support platform 126, and the brackets 112, 118 and 120 have been removed and replaced by a bottom cap 164. The bottom cap 164 is disposed in the passage 106 on top of the tabs 122. The bottom cap 164 has two slots 166 inside which the fasteners 116 are received. Nuts 168 are fastened to the fasteners 116, thereby fastening the bottom cap 164 to the top of the tunnel 18. The bottom cap 164 closes the bottom of the passage 106 and prevents access to the passage 148 formed between the bottom of the fuel tank 22 and the top of the tunnel 18, thereby preventing objects placed in the passage 106 from sliding between the bottom of the fuel tank 22 and the top of the tunnel 18. The cover 110 is closed on top of the passage 106 as described above to close the storage compartment defined by the passage 106. It is contemplated that a storage compartment defined by a passage 106 in a fuel tank 22 could also be provided on a snowmobile having a battery located in the engine compartment.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
a frame having a tunnel;
an engine supported by the frame;
at least one ski connected to the frame;
a drive track operatively connected to the engine and disposed at least in part below the tunnel; and
a fuel tank connected to a top of the tunnel, the fuel tank defining a passage extending therethrough from a top of the fuel tank to a bottom of the fuel tank, the passage being adapted for receiving a battery therein.

2. The snowmobile of claim 1, further comprising the battery disposed in the passage.

3. The snowmobile of claim 2, further comprising a seat connected to the top of the fuel tank.

4. The snowmobile of claim 3, wherein the passage is disposed rearward of the seat.

5. The snowmobile of claim 2, wherein the battery is connected to the tunnel.

6. The snowmobile of claim 5, further comprising a bracket disposed at least in part in the passage and connected to the tunnel;
wherein the battery is connected to the tunnel via the bracket.

7. The snowmobile of claim 6, wherein the bracket extends in part under the battery; and
further comprising a battery support platform disposed in the passage between the battery and the bracket.

8. The snowmobile of claim 7, wherein the battery support platform rests on the top of the tunnel.

9. The snowmobile of claim 7, wherein the fuel tank defines tabs extending inwardly in the passage; and
wherein the tabs are disposed between the battery support platform and the top of the tunnel.

10. The snowmobile of claim 7, wherein the battery support platform has at least one vertically extending tab abutting a side of the battery.

11. The snowmobile of claim 2, further comprising a battery support platform disposed in the passage between the battery and the top of the tunnel.

12. The snowmobile of claim 11, wherein the battery support platform rests on the top of the tunnel.

13. The snowmobile of claim 11, wherein the fuel tank defines tabs extending inwardly in the passage; and
wherein the tabs are disposed between the battery support platform and the top of the tunnel.

14. The snowmobile of claim 11, further comprising electrical cables connected to the battery;
wherein the passage is a first passage; and
wherein the electrical cables pass through a second passage defined between the battery support platform and a wall of the fuel tank defining the first passage.

15. The snowmobile of claim 11, wherein the battery support platform has at least one vertically extending tab abutting a side of the battery.

16. The snowmobile of claim 2, further comprising electrical cables connected to the battery;
wherein the passage is a first passage; and
wherein the electrical cables pass through a second passage defined between the top of the tunnel and a bottom of the fuel tank.

17. The snowmobile of claim 1, further comprising a cover selectively connected to the fuel tank for closing a top of the passage.

18. The snowmobile of claim 17, wherein the fuel tank defines at least in part at least one groove;
wherein the cover has at least one tongue; and
wherein the at least one tongue is disposed in the at least one groove when the cover is connected to the fuel tank for closing the top of the passage.

19. The snowmobile of claim 17, further comprising at least one fastener fastening the cover to the fuel tank when the cover is connected to the fuel tank for closing the top of the passage.

20. The snowmobile of claim 19, wherein the at least one fastener is at least one toolless fastener.

\* \* \* \* \*